US012613543B2

(12) United States Patent
Do et al.

(10) Patent No.: US 12,613,543 B2
(45) Date of Patent: Apr. 28, 2026

(54) ELECTRONIC DEVICES INCLUDING INTERNAL VOLTAGE GENERATION CIRCUITS

(71) Applicant: SK hynix Inc., Icheon-si Gyeonggi-do (KR)

(72) Inventors: Hyungrok Do, Icheon-si Gyeonggi-do (KR); Dae Han Kwon, Icheon-si Gyeonggi-do (KR); Kyu Dong Hwang, Icheon-si Gyeonggi-do (KR)

(73) Assignee: SK hynix Inc., Icheon-si (KR)

( * ) Notice: Subject to any disclaimer, the term of this patent is extended or adjusted under 35 U.S.C. 154(b) by 28 days.

(21) Appl. No.: 18/437,743

(22) Filed: Feb. 9, 2024

(65) Prior Publication Data

US 2025/0117034 A1 Apr. 10, 2025

(30) Foreign Application Priority Data

Oct. 4, 2023 (KR) ........................ 10-2023-0132065

(51) Int. Cl.
*G05F 1/575* (2006.01)

(52) U.S. Cl.
CPC .................................... *G05F 1/575* (2013.01)

(58) Field of Classification Search
None
See application file for complete search history.

(56) References Cited

U.S. PATENT DOCUMENTS

| | | | | |
|---|---|---|---|---|
| 9,734,904 | B1 * | 8/2017 | Cho | G05F 3/24 |
| 10,198,015 | B1 * | 2/2019 | Ham | G05F 1/575 |
| 10,635,124 | B2 * | 4/2020 | Mahajan | H02M 1/0045 |
| 11,296,596 | B1 * | 4/2022 | Kim | H02M 3/156 |
| 11,444,532 | B2 * | 9/2022 | Liu | H02M 3/158 |
| 11,675,379 | B2 * | 6/2023 | Ahmed | H02M 3/158<br>713/300 |
| 11,687,107 | B2 * | 6/2023 | Melanson | G05F 1/575<br>323/280 |
| 2014/0007777 | A1 | 1/2014 | Sweet et al. | |
| 2022/0011800 | A1 * | 1/2022 | Nasir | H02M 3/157 |

FOREIGN PATENT DOCUMENTS

KR 1020210051388 A 5/2021

* cited by examiner

*Primary Examiner* — Thomas J. Hiltunen
(74) *Attorney, Agent, or Firm* — WILLIAM PARK AND ASSOCIATES LTD.

(57) ABSTRACT

An electronic device includes an internal voltage generation circuit configured to detect a voltage level of an internal voltage, that is generated by the internal voltage generation circuit. The internal voltage generating circuit is also configured to generate a drive code, which, along with a drive clock, determines the magnitude of the generated internal voltage. The drive code may be reset responsive to the internal voltage. The electronic device also includes a load circuit which is powered by the generated internal voltage.

19 Claims, 9 Drawing Sheets

ELECTRONIC DEVICES INCLUDING INTERNAL VOLTAGE GENERATION CIRCUITS

CROSS-REFERENCE TO RELATED APPLICATIONS

The present application claims priority under 35 U.S.C. 119(a) to Korean Patent Application No. 10-2023-0132065, filed on Oct. 4, 2023, in the Korean Intellectual Property Office, which is incorporated herein by reference in its entirety.

BACKGROUND

1. Technical Field

This disclosure relates to electronic devices. More particularly this disclosure relates to internal voltage generation circuits for memory devices and other electronic semiconductor devices.

2. Related Art

Electronic devices such as cellular phones, laptops, and computers are equipped with internal voltage generation circuits which provide electrical energy to the device. As its name suggests, an internal voltage generation circuit is an electronic circuit located within or a part of an electronic device.

As used herein, an internal voltage generation circuit is a circuit comprised of electronic components, such as those depicted in FIG. 2, which are configured to provide an electric current, which is delivered or output from the internal voltage generation circuit at one or more voltage levels. The voltage levels are typically voltage levels required by the electronic device in which the internal voltage generation circuit is located.

When an electrical load (a load) on an internal voltage generation circuit increases, as happens when an electronic device such as a processor or memory device operates at an increased speed, or its ambient environment changes, a voltage loss, i.e., voltage drop out may occur because of an internal voltage generation circuit's inability to increase its output accordingly. A voltage drop out is thus considered herein to be an output voltage level magnitude decrease of significant magnitude that the functional operation of the device suffers or decreases. Stated another way when the voltage level of the internal voltage drops out, an error may occur in one or more operations performed by an electronic device that receives the internally-generated voltage.

SUMMARY

In accordance with an embodiment of the present disclosure, an electronic device may include an internal voltage generation circuit configured to detect an internal voltage and generate a drive code, responsive to a drive clock. The internal voltage generation circuit is also configured to drive or generate the internal voltage, responsive to the drive code, the drive code being reset responsive to the generated internal voltage and responsive to a load circuit configured to receive the internally-generated voltage required to perform an internal operation.

In accordance with another embodiment of the present disclosure, an electronic device may include an internal voltage generation circuit configured to detect a voltage level of an internal voltage, generate a drive code, responsive to a drive clock and to generate the internal voltage, responsive to the drive code, the drive code being reset, responsive to the internal voltage and responsive to an operation flag as well as a load circuit configured to receive the internal voltage to perform an internal operation. The operation flag may be generated in relation to the internal operation of the load circuit.

In accordance with further another embodiment of the present disclosure, an internal voltage generation circuit may include a drive control circuit configured to generate a drive control signal, responsive to a feedback voltage generated from an internal voltage and a reference voltage, a code generation circuit configured to generate a drive code, responsive to the drive control signal, and a drive circuit configured to drive the internal voltage, responsive to the drive code. The drive code may be reset when the feedback voltage is generated at a voltage level equal to or greater than that of the reference voltage.

DETAILED DESCRIPTION

Figure 1:
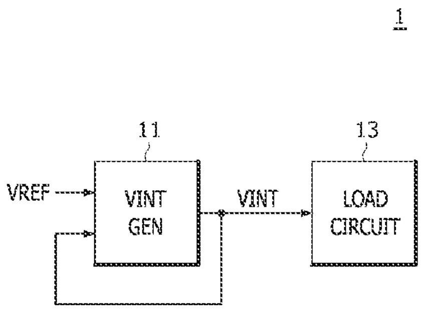
FIG. 1 is a block diagram illustrating an electronic device according to an embodiment of the present disclosure.

In the following description of embodiments, when a parameter is referred to as being "predetermined," it may be intended to mean that a value of the parameter is determined in advance when the parameter is used in a process or an algorithm. The value of the parameter may be set when the process or the algorithm starts or may be set during a period in which the process or the algorithm is executed.

It will be understood that although the terms "first," "second," "third," etc. are used herein to describe various elements, these elements should not be limited by these terms. These terms are only used to distinguish one element from another element and are not intended to imply an order or number of elements. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In various preferred embodiments, a logic "high" level and a logic "low" level may be used to describe relative voltage levels of electric signals. A signal having a logic "high" level may be a positive voltage greater than predetermined volts whereas a signal having a logic "low" level may be voltage less than or equal to predetermined volts. In an alternate embodiment, the logic "high" level may be set as a voltage level which is less than predetermined volts whereas a logic low level may be predetermined volts. In other words, the actual voltages of logic levels is a design choice and may be set to be different or opposite according to the requirements of particular embodiments. For example, in an alternate embodiment that uses negative logic, a certain signal having a logic "high" voltage level in one embodiment may be set to have a logic "low" voltage level in another embodiment.

The term "logic bit set" may mean a set of binary digits, i.e., bits, each bit having its own value. A logic bit set is thus a set of bits; the set of bits thus has a combination of logic levels. When the logic level of each of the bits included in the signal is changed, the logic bit set of the signal may be set differently. For example, when the signal includes two bits, when the logic level of each of the two bits included in the signal is "logic low level, logic low level", the logic bit set of the signal may be set as the first logic bit set, and when the logic level of each of the two bits included in the signal is "a logic low level and a logic high level", the logic bit set of the signal may be set as the second logic bit set.

Various embodiments of the present disclosure will be described hereinafter in more detail with reference to the accompanying drawings. However, the embodiments described herein are for illustrative purposes only and are not intended to limit the scope of the present disclosure.

FIG. 1 is a block diagram illustrating a configuration of an electronic device 1 according to an embodiment of the present disclosure. The electronic device 1 shown in FIG. 1 may include an internal voltage generation circuit (VINT GEN) 11 and a load circuit (LOAD CIRCUIT) 13.

The internal voltage generation circuit 11 may be configured to detect a voltage level of its output voltage VINT, which is considered herein to be an internally-generated voltage. VINT is output from the internal voltage generation circuit 11 and drives a load circuit 13. When adjusting the internal voltage VINT is required, responsive to a reference voltage VREF, the internal voltage generation circuit 11 may generate a drive code (DR_CD in FIG. 2), responsive to a drive clock (DCLK in FIG. 2) and adjust the magnitude of the internal voltage VINT according to the drive code (DR_CD in FIG. 2). The internal voltage generation circuit 11 may adjust the internal voltage VINT by the drive code (DR_CD in FIG. 2) generated from the drive clock (DCLK in FIG. 2). When resetting the internal voltage VINT is required, as determined by the reference voltage VREF, the internal voltage generation circuit 11 may stop the generation of the drive clock (DCLK in FIG. 2) and reset the drive code (DR_CD in FIG. 2), thereby reducing current consumption.

The internal voltage generation circuit 11 may supply the internal voltage VINT to the load circuit 13. The load circuit 13 may receive the internal voltage VINT to perform various internal operations. When the load circuit 13 draws current from the internal voltage generation circuit, as will happen when the load circuit 13 is connected and operating, the voltage level of the internal voltage VINT may decrease. The magnitude of the internal voltage VINT decrease will typically correspond to the magnitude of the load current (121 in FIG. 2) drawn by the load circuit 13 from the output node nd_OUT through which the internal voltage VINT is output.

Figure 2:
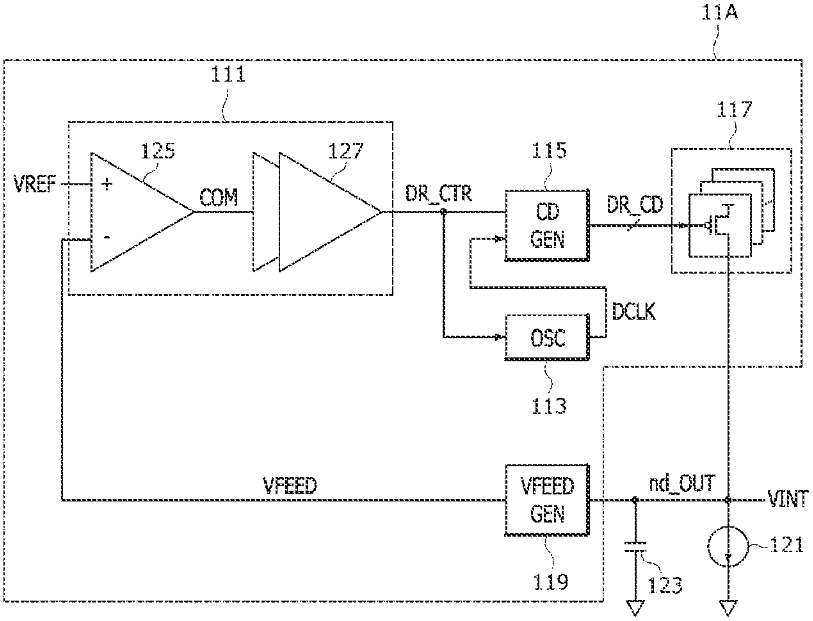
FIG. 2 is a schematic block diagram illustrating a configuration according to an example of an internal voltage generation circuit included in the electronic device shown in FIG. 1.

FIG. 2 is a block diagram illustrating a configuration of an internal voltage generation circuit 11A according to an example of the internal voltage generation circuit 11 shown in FIG. 1.

As shown in FIG. 2, the internal voltage generation circuit 11A may include a drive control circuit 111, an oscillator (OSC) 113, a code generation circuit (CD GEN) 115, a drive circuit 117, and a feedback voltage generation circuit (VFEED GEN) 119.

The drive control circuit 111 may include a comparison circuit 125, preferably embodied as a comparator the output of which is a binary-valued comparison signal COM. The drive control circuit 111 may also include a drive control signal generation circuit 127, which may be embodied as a non-inverting, unity-gain operational amplifier.

The comparison circuit 125 may generate a comparison signal COM, responsive to a magnitude difference between the reference voltage VREF and a feedback voltage VFEED. The comparison circuit 125 may compare the reference voltage VREF and the feedback voltage VFEED and generate the comparison signal COM having either a high or a low logic level responsive to a comparison of the magnitudes of the two input signals to each other. As an example, the comparison circuit 125 may generate a "high" logic level COM output signal when the feedback voltage VFEED is at a voltage level less than the voltage level of the reference voltage VREF. The comparison circuit 125 may generate a "low" logic level COM output signal when the magnitude of the feedback voltage VFEED is equal to or greater than the magnitude of the reference voltage VREF. The drive control signal generation circuit 127 may receive the comparison signal COM from the electrically connected comparison circuit 125, and generate a drive control signal DR_CTR, responsive to the comparison signal COM.

The drive control signal generation circuit 127 may generate the drive control signal DR_CTR to have the same logic level as the comparison signal COM. The drive control circuit 111 may compare the reference voltage VREF and the feedback voltage VFEED to each other in order to detect whether adjusting the internal voltage VINT is required or resetting the internal voltage VINT is required. The VREF and VFEED voltages are also compared to each other in order to generate the drive control signal DR_CTR to have a logic level according to a detection result. As an example, the drive control circuit 111 may generate the drive control signal DR_CTR of a logic "high" level when adjusting the internal voltage VINT is required and generate the drive control signal DR_CTR of a logic "low" level when resetting the internal voltage VINT is required. The drive control signal generation circuit 127 may also generate the drive control signal DR_CTR such that the drive control signal DR_CTR has a voltage level different from the comparison signal COM voltage level. The drive control circuit 111 may be electrically connected to both the oscillator 113 and the code generation circuit 115 in order to supply the drive control signal DR CTR to both the oscillator 113 and the code generation circuit 115.

The oscillator 113 may receive the drive control signal DR_CTR from the drive control circuit 111 and generate the drive clock DCLK, responsive to the drive control signal DR_CTR. The oscillator 113 may determine whether to generate the drive clock DCLK responsive to the logic level of the drive control signal DR_CTR. As an example, the oscillator 113 may activate the drive clock DCLK when the drive control signal DR_CTR of a logic "high" level is generated. As another example, the oscillator 113 may deactivate the drive clock DCLK when drive control signal DR_CTR of a logic "low" level is generated. The oscillator 113 may be electrically connected to the code generation circuit 115 to supply the drive clock DCLK to the code generation circuit 115.

The code generation circuit 115 may receive the drive control signal DR_CTR from the drive control circuit 111. It may also, receive the drive clock DCLK from the oscillator 113. From those two signals, it may generate the drive code DR_CD. The code generation circuit thus generates the drive code DR_CD, responsive to both the drive control signal DR_CTR and the drive clock DCLK.

The code generation circuit 115 may generate the drive code DR_CD or reset the drive code DR_CD, responsive to the drive clock DCLK and responsive to the logic level of the drive control signal DR_CTR. By way of example, the code generation circuit 115 may count drive clock DCLK pulses in order to generate the drive code DR_CD, a logic bit of which set is then set to increase a code value, i.e., increase the drive code value, when the drive control signal DR_CTR is a logic one, i.e., at a "high" logic level. As another example, the code generation circuit 115 may reset the drive code DR_CD when the drive control signal DR_CTR is a logic zero, i.e., at a logic "low" level.

Each bit that makes up the set of bits that comprise the reset drive code DR_CD may be set in various ways, i.e., a logic zero or logic one, as a design choice. The code generation circuit 115 may be electrically connected to the drive circuit 117 to provide the drive code DR_CD to the drive circuit 117.

Still referring to FIG. 2, the drive circuit 117 may receive the drive code DR_CD from the code generation circuit 115, and generate the internal voltage VINT, responsive to the value of the drive code DR_CD. The drive circuit 117 may include a plurality of voltage drivers, the number of drivers corresponding to the number of bits included in the drive code DR_CD. Each of the driving elements included in the drive circuit 117 may be implemented with a transistor.

The numeric value of the drive code DR_CD provided to the drive circuit 117 determines, i.e., controls, the magnitude of the internally generated voltage VINT output from the drive circuit 117. The drive code DR_CD is thus considered herein as being a "driving signal" or a "driving force" for the drive circuit 117. "Driving force" should thus be construed as a signal that determines or controls or specifies the magnitude of "internal voltage" output from or generated by the drive circuit 117.

As the numeric value of the drive code DR_CD provided to the drive circuit 117 is increased, the driving signal or "driving force" sent to the internal voltage VINT increases. As a result, an increase or decrease in the driving force, i.e., the numeric value of DR_CD, will increase or decrease the magnitude of the internally-generated voltage VINT that is provided to the load circuit 13. When the drive code DR_CD is reset, i.e., set to zero or some other predetermined reference value, the drive circuit 117 may output a predetermined quiescent (inactive or resting) internal voltage VINT, preferably zero volts or ground or other reference potential. The initial driving force may be set at various levels as a design choice.

As shown in FIG. 2, VINT output from the drive circuit 117 may be electrically connected to the feedback voltage generation circuit 119 and thus supply the generated internal voltage VINT to the feedback voltage generation circuit 119.

The feedback voltage generation circuit 119 may thus generate the feedback voltage VFEED, responsive to the magnitude of the internal voltage VINT. In different embodiments, the feedback voltage generation circuit 119 may divide (or multiply in different embodiments) the internal voltage VINT in order to generate the feedback voltage VFEED. In those embodiments, the feedback voltage VFEED may be generated to have a voltage level less than or greater than the internal voltage VINT. Depending on the embodiment, the feedback voltage generation circuit 119 may be implemented to buffer the internal voltage VINT in order to generate the feedback voltage VFEED that is set to have the same voltage level as the internal voltage VINT. The feedback voltage generation circuit 119 may generate the feedback voltage VFEED having the reset voltage level when the voltage level of the internal voltage VINT is reset.

The load current source 121 and a filter capacitor 123 may be electrically connected to the output node nd_OUT from which the internally-generated voltage VINT and an internally-source power supply current is output. The amount of load current provided by the load current source 121 may be determined according to the degree or amount by which the voltage level of the internal voltage VINT is decreased when the a load circuit 13 is operating.

The internal voltage generation circuit 11A shown in FIG. 2A may reduce current consumption by stopping the drive clock DCLK and resetting the drive code DR_CD when resetting the internal voltage VINT is required. When adjusting the internal voltage VINT is required, the internal voltage generation circuit 11A may increment or set the count value of the drive clock DCLK and generate a drive code DR_CD whose logic bits set are set in order to set or adjust the magnitude of the internal voltage VINT, thereby simply and quickly adjusting the voltage level of the generated internal voltage VINT so that a required operating voltage of a load is provided.

Figure 3:
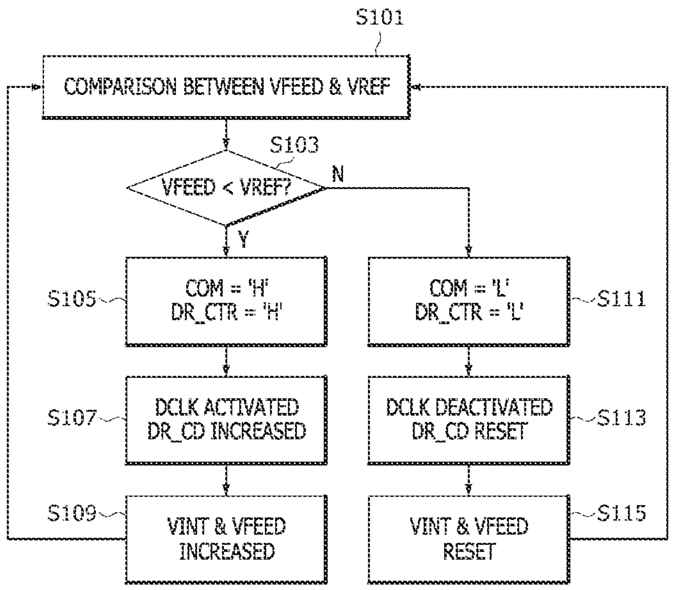
FIG. 3 is a flowchart illustrating steps of a method of operating the internal voltage generation circuit shown in FIG. 2.

FIG. 3 is a flowchart illustrating steps of a method of an operation of the internal voltage generation circuit 11A shown in FIG. 2. The operation of the internal voltage generation circuit 11A will be described with reference to FIGS. 2 and 3. The operation of the internal voltage generation circuit 11A will be described by dividing the operation into when the feedback voltage VFEED is generated at a voltage level less than that of the reference voltage VREF and when the feedback voltage VFEED is generated at a voltage level equal to or greater than that of the reference voltage VREF as follows.

Comparison of the feedback voltage VFEED and the reference voltage VREF may be performed at step S101. (S101). When the feedback voltage VFEED is a voltagless than the reference voltage VREF (S103, 'Y'), the drive control circuit 111 may generate the comparison signal COM and output the drive control signal DR_CTR at a logic one, i.e., a logic "high" level 'H' at step S105. The oscillator 113 may activate (generate) the drive clock DCLK when the drive control signal DR_CTR provided to the oscillator 113 is at a logic "high" level 'H.'

When adjusting the internal voltage VINT is required and when the drive control signal DR_CTR is a logic "high" level 'H,' the code generation circuit 115 may count or increment the drive clock DCLK in order to generate the drive code DR_CD, including bits whose logic value is set to increase a code value (S107). The drive circuit 117 may receive the drive code DR_CD with the increased code value, which cause the drive circuit 117 to output the internal voltage VINT having an increased voltage level. The feedback voltage generation circuit 119, which receives VINT, may then generate the feedback voltage VFEED having an increased voltage level due to the increased level of the internal voltage VINT (S109).

As a result of the comparison between the feedback voltage VFFED and the reference voltage VREF (S101), when the feedback voltage VFEED is generated at a logic level equal to or greater than that of the reference voltage VREF, the drive control circuit 111 may generate the comparison signal COM and the drive control signal DR_CTR each set to have a logic "low" level 'L' (S111). The oscillator 113 may deactivate the drive clock DCLK when the drive control signal DR_CTR set to have a logic "low" level 'L.' When resetting the internal voltage VINT is required and the drive control signal DR_CTR of a logic "low" level 'L,' the code generation circuit 115 may reset (zeroed out) the drive code DR_CD (S113). By the reset drive code DR_CD, the driving force (the value of the drive code DR_CD) for the internal voltage VINT output from the drive circuit 117 may be set to have an initial magnitude so that the voltage level of the internal voltage VINT may be reset (zeroed out). and the voltage level of the feedback voltage VFEED generated in the feedback voltage generation circuit 119 may also be reset (zeroed out). (S115)

Figure 4:
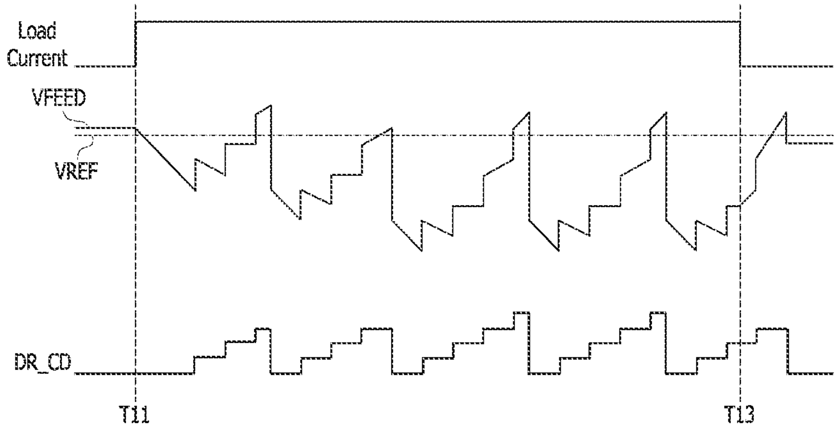
FIGS. 4 and 5 are timing diagrams illustrating the operation of the internal voltage generation circuit shown in FIG. 2.
Figure 5:
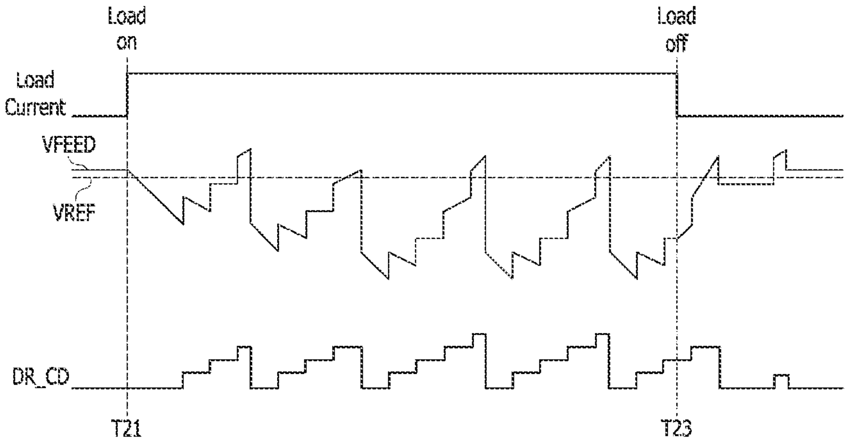

FIGS. 4 and 5 are timing diagrams illustrating the operation of the internal voltage generation circuit 11A shown in FIG. 2.

As shown in FIG. 4, during a section from a time T11 to a time T13, when the load circuit (e.g., 13 in FIG. 1) is operated and the load current of the load current source 121 is generated, the code value of the drive code DR_CD may be adjusted up or down (increased or decreased) according to the comparison result of the feedback voltage VFEED and the reference voltage VREF. That is, when the feedback voltage VFEED is generated at a voltage level less than that of the reference voltage VREF, the code value of the drive code DR_CD may be incrementally increased. As a result the voltage level of the feedback voltage VFEED may be increased. When the feedback voltage VFEED is generated at a voltage level equal to or greater than that of the reference voltage VREF, the drive code DR_CD may be reset (zeroed) _and the voltage level of the feedback voltage VFEED may also be reset. Because the reset feedback voltage VFEED is set to have a voltage level less than that of the reference voltage VREF, the operation of sequentially increasing the code value of the drive code DR_CD may be repeated until a time T13, when the load current is generated. After time T13, when no load current is generated, the voltage level of the feedback voltage VFEED may be increased once according to the drive code DR_CD and then maintained in the reset state.

As shown in FIG. 5, during the time interval between time T21 and time T23, when the load circuit (e.g., 13 in FIG. 1) is operated and the load current of the load current source 121 is generated, the value of the drive code DR CD may be adjusted up or down according to the comparison of the feedback voltage VFEED and the reference voltage VREF. That is, when the feedback voltage VFEED is generated at a voltage level less than that of the reference voltage VREF, the code value of the drive code DR_CD may be increased whereby the feedback voltage VFEED may be increased. When the feedback voltage VFEED is generated at a voltage level equal to or greater than that of the reference voltage VREF, the drive code DR_CD may be reset and the voltage level of the feedback voltage VFEED may also be reset.

As shown in FIG. 5, during the time interval between time T21 and time T23, when the load circuit (e.g., 13 in FIG. 1) is operated and the load current of the load current source 121 is generated, the value of the drive code DR_CD may be adjusted up or down according to the comparison of the feedback voltage VFEED and the reference voltage VREF. That is, when the feedback voltage VFEED is generated at a voltage level less than that of the reference voltage VREF, the code value of the drive code DR_CD may be increased whereby the the feedback voltage VFEED may be increased. When the feedback voltage VFEED is generated at a voltage level equal to or greater than that of the reference voltage VREF, the drive code DR_CD may be reset and the voltage level of the feedback voltage VFEED may also be reset.

Because the reset feedback voltage VFEED is set to have a voltage level less than that of the reference voltage VREF, the operation of sequentially or incrementally increasing the code value of the drive code DR_CD may be repeated until the time T23, whereupon the load current is generated. After the time T23, when no load current is generated, the feedback voltage VFEED may be maintained in the reset state after the voltage level is increased twice according to the drive code DR_CD.

Figure 6:
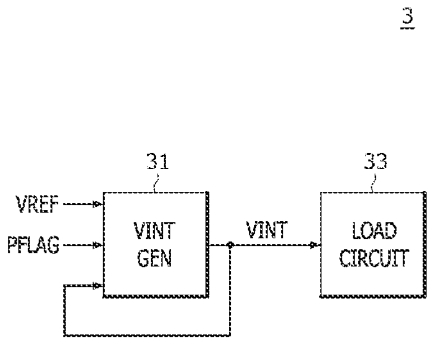
FIG. 6 is a block diagram illustrating a configuration of an electronic device according to another embodiment of the present disclosure.

FIG. 6 is a block diagram illustrating a configuration of an electronic device 3 according to another embodiment of the present disclosure.

As shown in FIG. 6, the electronic device 3 may include an internal voltage generation circuit (VINT GEN) 31 and a load circuit (LOAD CIRCUIT) 33 as described above and depicted in FIG. 2

When adjusting the internal voltage VINT is required, responsive to a reference voltage VREF, the internal voltage generation circuit 31 may generate a drive code (DR_CD in FIG. 7), responsive to a drive clock (DCLK in FIG. 7) and adjust the driving force that drives the internal voltage VINT according to the drive code DR_CD. The internal voltage generation circuit 31 may quickly adjust the driving force of the internal voltage VINT by the drive code (DR_CD in FIG. 7) generated according to the drive clock (DCLK in FIG. 7). When resetting the internal voltage VINT is required, responsive to the reference voltage VREF and an operation flag PFLAG, the internal voltage generation circuit 31 may stop generating the drive clock (DCLK in FIG. 7) and reset the drive code (DR_CD in FIG. 7), responsive to the reference voltage VREF, thereby reducing current consumption. The operation flag PFLAG may be generated before the operation of the load circuit 33 is stopped and the generation of load current is stopped.

In an embodiment, the operation flag PFLAG may be implemented to be generated when or after the operation of the load circuit 33 is stopped and the load current is stopped. The internal voltage generation circuit 31 may supply the internal voltage VINT to the load circuit 33.

The load circuit 33 may receive the internal voltage VINT to perform various internal operations. When the operation of the load circuit 33 is performed, the voltage level of the internal voltage VINT may be decreased, and the decrease in the voltage level of the internal voltage VINT may be considered as a load current (321 in FIG. 7) of an output node nd_OUT through which the internal voltage VINT is output.

Figure 7:
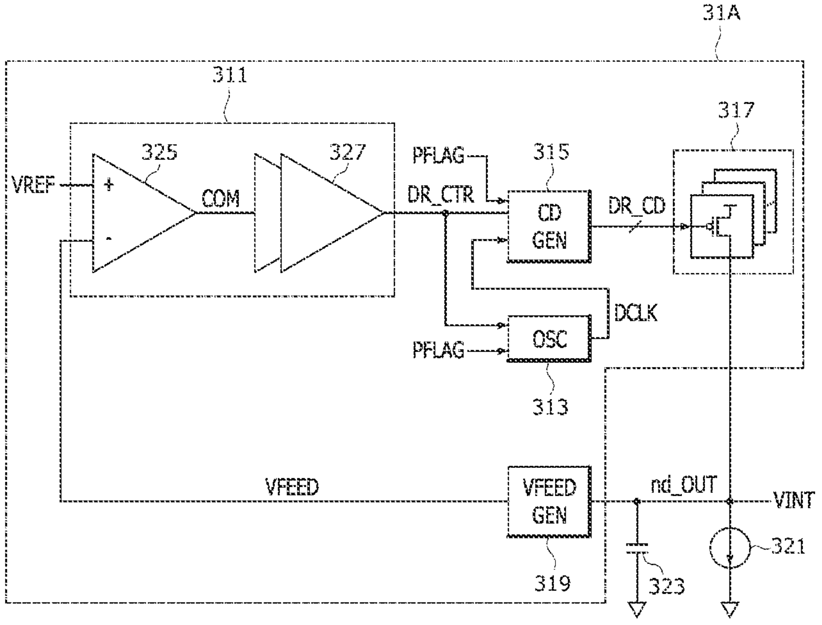
FIG. 7 is a schematic block diagram illustrating a configuration according to an example of an internal voltage generation circuit included in the electronic device shown in FIG. 6.

FIG. 7 is a block diagram illustrating a configuration of an internal voltage generation circuit 31A according to an example of the internal voltage generation circuit 31 shown in FIG. 6.

As shown in FIG. 7, the internal voltage generation circuit 31A may include a drive control circuit 311, an oscillator (OSC) 313, a code generation circuit (CD GEN) 315, a drive circuit 317, and a feedback voltage generation circuit (VFEED GEN) 319.

The drive control circuit 311 may include a comparison circuit 325 and a drive control signal generation circuit 327. The comparison circuit 325 may generate the comparison signal COM, responsive to the reference voltage VREF and the feedback voltage VFEED. The comparison circuit 325 may compare the reference voltage VREF and the feedback voltage VFEED and generate the comparison signal COM having a logic level according to a comparison result. As an example, the comparison circuit 325 may generate the comparison signal COM of a logic "high" level when the feedback voltage VFEED is generated at a voltage level less than that of the reference voltage VREF and generate the comparison signal COM of a logic "low" level when the feedback voltage VFEED is generated at a voltage level equal to or greater than that of the reference voltage VREF. The drive control signal generation circuit 327 may receive the comparison signal COM from the electrically connected comparison circuit 325 and generate the drive control signal DR_CTR, responsive to the comparison signal COM. The drive control signal generation circuit 327 may generate the drive control signal DR_CTR set to have the same logic level as the comparison signal COM. The drive control circuit 311 may compare the reference voltage VREF and the feedback voltage VFEED and generate the drive control signal DR_CTR having a logic level according to a comparison result. As an example, the drive control circuit 311 may generate the drive control signal DR_CTR of a logic "high" level when the feedback voltage VFEED is generated at a voltage level less than that of the reference voltage VREF, and generate the drive control signal DR_CTR of a logic "low" level when the feedback voltage VFEED is generated at a voltage level equal to or greater than that of the reference voltage VREF. The drive control signal generation circuit 327 may generate the drive control signal DR_CTR driven at a voltage level different from the comparison signal COM. The drive control circuit 311 may be electrically connected to the oscillator 313 and the code generation circuit 315 to supply the drive control signal DR_CTR to the oscillator 313 and the code generation circuit 315.

The oscillator 313 may receive the drive control signal DR_CTR from the drive control circuit 311, and generate the drive clock DCLK, responsive to the drive control signal DR_CTR and the operation flag PFLAG. The oscillator 313 may adjust whether to generate the drive clock DCLK depending on the logic level of the drive control signal DR_CTR and whether the operation flag PFLAG is generated. As an example, the oscillator 313 may activate the drive clock DCLK when the drive control signal DR_CTR of a logic "high" level is generated. As another example, the oscillator 313 may deactivate the drive clock DCLK when the drive control signal DR_CTR is generated at a logic "low" level, and the operation flag PFLAG is generated at a logic "high" level. As further another example, the oscillator 313 may activate the drive clock DCLK when the drive control signal DR_CTR is generated at a logic "low" level, and the operation flag PFLAG is not generated at a logic "high" level. The oscillator 313 may be electrically connected to the code generation circuit 315 to supply the drive clock DCLK to the code generation circuit 315.

The code generation circuit 315 may receive the drive control signal DR_CTR from the drive control circuit 311, receive the drive clock DCLK from the oscillator 313, and generate the drive code DR_CD, responsive to the drive control signal DR_CTR, the drive clock DCLK, and the operation flag PFLAG. The code generation circuit 315 may generate the drive code DR_CD or reset the drive code DR_CD, responsive to the drive clock DCLK depending on the logic level of the drive control signal DR_CTR and whether the operation flag PFLAG is generated. As an example, when the drive control signal DR_CTR of a logic "high" level is generated, the code generation circuit 315 may count the drive clock DCLK to generate the drive code DR_CD including bits whose logic bit set is set to increase a code value. As another example, when the drive control signal DR_CTR of a logic "low" level is generated, and the operation flag PFLAG is generated at a logic "high" level, the code generation circuit 315 may reset the drive code DR_CD. The logic bit set of the bits included in the reset drive code DR_CD may be set in various ways according to the embodiment. As further another example, when the drive control signal DR_CTR of a logic "low" level is generated, and the operation flag PFLAG is not generated, the code generation circuit 315 may count the drive clock DCLK to generate the drive code DR_CD including bits whose logic bit set is set to decrease the code value. The code generation circuit 315 may be electrically connected to the drive circuit 317 to supply the drive code DR_CD to the drive circuit 317.

The drive circuit 317 may receive the drive code DR_CD from the code generation circuit 315, and drive the internal voltage VINT, responsive to the drive code DR_CD. The drive circuit 317 may include a plurality of driving elements respectively corresponding to the bits included in the drive code DR_CD. Each of the driving elements included in the drive circuit 317 may be implemented with a PMOS transistor, but this is only an example, and the present disclosure is not limited thereto. As the code value of the drive code DR_CD increases, the driving force for driving the internal voltage VINT in the drive circuit 317 may be set to be large, and as the code value of the drive code DR_CD decreases, the driving force for driving the internal voltage VINT in the drive circuit 317 may be set to be small. When the drive code DR_CD is reset, the drive circuit 317 may reset the voltage level of the internal voltage VINT by setting the driving force for driving the internal voltage VINT to a preset initial driving force. The drive circuit 317 may be electrically connected to the feedback voltage generation circuit 319 to supply the internal voltage VINT to the feedback voltage generation circuit 319.

The feedback voltage generation circuit 319 may receive the internal voltage VINT from the drive circuit 317, and generate the feedback voltage VFEED, responsive to the internal voltage VINT. The feedback voltage generation circuit 319 may divide the internal voltage VINT to generate the feedback voltage VFEED. In this case, the feedback voltage VFEED may be set to have a voltage level less than that of the internal voltage VINT. According to the embodiment, the feedback voltage generation circuit 319 may be implemented to buffer the internal voltage VINT to generate the feedback voltage VFEED that is set to have the same voltage level as the internal voltage VINT. The feedback voltage generation circuit 319 may generate the feedback voltage VFEED having a reset voltage level when the voltage level of the internal voltage VINT is reset.

The load current source 321 and a capacitor 323 may be electrically connected to an output node nd_OUT through which the internal voltage VINT is output. The current amount of the load current source 321 may be determined according to the degree to which the voltage level of the internal voltage VINT is reduced when the operation of the load circuit 33 is performed.

The internal voltage generation circuit 31A may stop the generation of the drive clock DCLK and reset the drive code DR_CD to reduce current consumption when the feedback voltage VFEED is generated at a voltage level equal to or greater than that of the reference voltage VREF and the operation flag PFLAG is generated at a logic "high" level. In addition, when the feedback voltage VFEED is generated at a voltage level less than that of the reference voltage VREF, the internal voltage generation circuit 31A may count the drive clock DCLK and generate the drive code DR_CD whose logic bit set is set to adjust the driving force that drives the internal voltage VINT, thereby quickly adjusting the voltage level of the internal voltage VINT.

Figure 8:
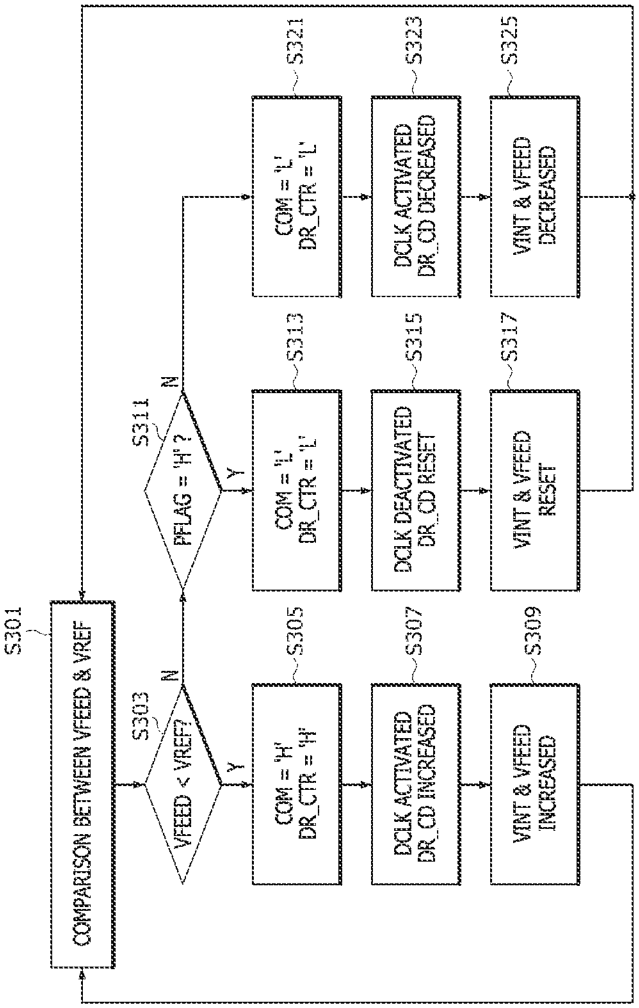
FIG. 8 is a flowchart illustrating another method of operating the internal voltage generation circuit shown in FIG. 7.

FIG. 8 is a flowchart illustrating an operation of the internal voltage generation circuit 31A shown in FIG. 7. The operation of the internal voltage generation circuit 31A will be described with reference to FIGS. 7 and 8. The operation of the internal voltage generation circuit 31A will be described by dividing the operation into when the feedback voltage VFEED is generated at a voltage level less than that of the reference voltage VREF, when the feedback voltage VFEED is generated at a voltage level equal to or greater than that of the reference voltage VREF and the operation flag PFLAG is generated, and when the feedback voltage VFEED is generated at a voltage level equal to or greater than that of the reference voltage VREF and the operation flag PFLAG is not generated, as follows.

First, the feedback voltage VFEED and the reference voltage VREF may be compared to each other, typically by a voltage comparator, the structure and operation of which is well known to those of ordinary skill in the electronic art. (S301). As a result of comparison, when the feedback voltage VFEED is generated at a voltage level less than that of the reference voltage VREF (S303, 'Y'), the drive control circuit 311 may generate the comparison signal COM and the drive control signal DR_CTR each set to have a logic "high" level 'H' (S305). The oscillator 313 may activate the drive clock DCLK when the drive control signal DR_CTR set to have a logic "high" level 'H' is received (S307). When the drive control signal DR_CTR of a logic "high" level 'H' is generated, the code generation circuit 315 may count the drive clock DCLK to generate the drive code DR_CD including bits whose logic bit set is set to increase the code value (S307). The drive circuit 317 may receive the drive code DR_CD with the increased code value to generate the internal voltage VINT driven at an increased voltage level, and the feedback voltage generation circuit 319 may also generate the feedback voltage VFEED with an increased voltage level according to the internal voltage VINT (S309).

Next, as a result of a comparison of the feedback voltage VFEED to the reference voltage VREF (S301), when the feedback voltage VFEED is generated at a voltage level equal to or greater than that of the reference voltage VREF and the operation flag PFLAG is generated at a logic "high" level 'H' (S303 'N', S311 'Y'), the drive control circuit 311 may generate the comparison signal COM and the drive control signal DR_CTR each set to have a logic "low" level 'L' (S313). The oscillator 313 may stop sending or deactivate the drive clock DCLK when the drive control signal DR_CTR set to have a logic "low" level 'L' is received and the operation flag PFLAG is generated at a logic "high" level 'H' (S315). When the drive control signal DR_CTR is generated at a logic "low" level 'L', and the operation flag PFLAG is generated at a logic "high" level 'H', the code generation circuit 315 may reset the drive code DR_CD (S315). The driving force that drives the internal voltage VINT in the drive circuit 117 may be set to an initial driving force by the reset drive code DR_CD, the voltage level of the internal voltage VINT may be reset, and the feedback voltage VFEED generated in the feedback voltage generation circuit 319 may also be reset (S317).

Next, as a result of comparison between the feedback voltage VFEED and the reference voltage VREF (S301), when the feedback voltage VFEED is generated at a voltage level equal to or greater than that of the reference voltage VREF and the operation flag PFLAG is not generated at a logic "high" level 'H' (S303 'N', S311 'N'), the drive control circuit 311 may generate the comparison signal COM and the drive control signal DR_CTR each set to have a logic "low" level 'L' (S321). When the drive control signal DR_CTR set to have a logic "low" level 'L' is received and the operation flag PFLAG is not generated at a logic "high" level 'H', the oscillator 313 may activate the drive clock DCLK (S323). When the drive control signal DR_CTR is generated at a logic "low" level 'L', and the operation flag PFLAG is not generated at a logic "high" level 'H', the code generation circuit 315 may count the drive clock DCLK to generate the drive code DR_CD including bits whose logic bit set is set to decrease the code value (S323). The drive circuit 317 may receive the drive code DR_CD with the decreased code value to generate the internal voltage VINT driven at the decreased voltage level, and the feedback voltage generation circuit 319 may also generate the feedback voltage VFEED with a reduced voltage level according to the internal voltage VINT (S325).

Figure 9:
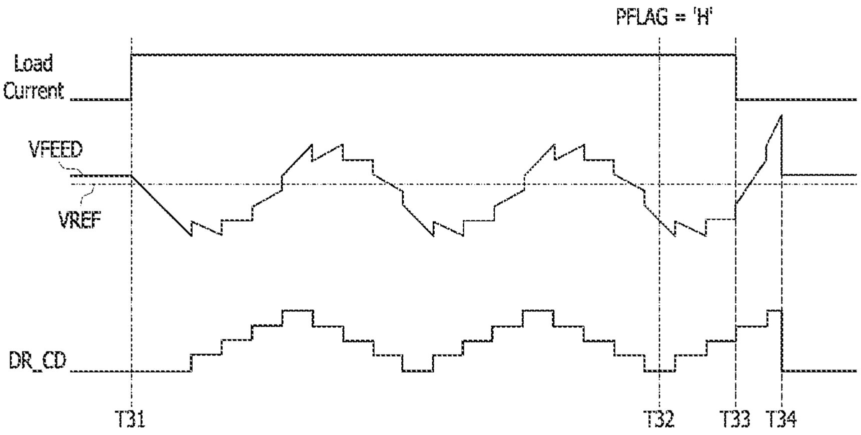
FIG. 9 is a timing diagram illustrating the operation of the internal voltage generation circuit shown in FIG. 7.

FIG. 9 is a timing diagram illustrating the operation of the internal voltage generation circuit 31A shown in FIG. 7.

As shown in FIG. 9, during the section from a time T31 to a time T33, when the load circuit (e.g., 33 in FIG. 6) is operated and the load current of the load current source 321 is generated, the code value of the drive code DR_CD may be adjusted according to the comparison result of the feedback voltage VFEED and the reference voltage VREF. That is, when the feedback voltage VFEED is generated at a voltage level less than that of the reference voltage VREF, the code value of the drive code DR_CD may be increased sequentially, and the voltage level of the feedback voltage VFEED may be increased. Meanwhile, when the feedback voltage VFEED is generated at a voltage level equal to or greater than that of the reference voltage VREF and the operation flag PFLAG is not generated at a logic "high" level 'H', the code value of the drive code DR_CD may be sequentially decreased, and the voltage level of the feedback voltage VFEED may be decreased. The operation of sequentially increasing and decreasing the code value of the drive code DR_CD may be repeated until the time T33, when the generation of load current stops. At the time T32, when the operation flag PFLAG is generated at a logic "high" level 'H' and the feedback voltage VFEED is generated at a voltage level equal to or greater than that of the reference voltage VREF, the drive code DR_CD may be reset at a time T34, and the voltage level of the feedback voltage VFEED may also be reset.

Concepts have been disclosed in conjunction with some embodiments as described above. Those skilled in the art will appreciate that various modifications, additions, and substitutions are possible, without departing from the scope and spirit of the present disclosure. Accordingly, the embodiments disclosed in the present specification should be considered from not a restrictive standpoint but rather from an illustrative standpoint. The scope of the concepts is not limited to the above descriptions but defined by the accompanying claims, and all of distinctive features in the equivalent scope should be construed as being included in the concepts.

What is claimed is:

1. An electronic device comprising:
an internal voltage generation circuit configured to:
detect a voltage level of an internal voltage;
generate a drive code having a value, which is determined by a drive clock; and
generate the internal voltage as an output of the internal voltage generation circuit, the internal voltage having a magnitude which corresponds to the drive code value, the drive code being reset responsive to receipt of a predetermined magnitude internal voltage; and
a load circuit configured to receive the internal voltage;
wherein the internal voltage generation circuit comprises a drive control circuit configured to generate a drive control signal, responsive to a feedback voltage generated from the internal voltage and a reference voltage, an oscillator configured to receive the drive control signal to generate the drive clock, and a code generation circuit configured to receive the drive control signal and the drive clock to generate the drive code, and
wherein the code generation circuit is configured to reset the drive code when the feedback voltage is generated at a voltage level equal to or greater than that of the reference voltage.

2. The electronic device of claim 1, wherein the internal voltage generation circuit is configured to change the magnitude of the internal voltage in response to a change in the value of the drive code.

3. The electronic device of claim 2, wherein the internal voltage generation circuit is configured to enable or disable the drive clock, in response to the internal voltage.

4. The electronic device of claim 1, wherein the internal voltage generation circuit is configured to deactivate the drive clock and reset the drive code when resetting the internal voltage is not required.

5. The electronic device of claim 1, wherein the internal voltage generation circuit further comprises:
a drive circuit configured to generate the internal voltage, responsive to the value of the drive code.

6. The electronic device of claim 5, wherein the drive control circuit is configured to generate the drive control signal having a logic level set according to a comparison of the feedback voltage and the reference voltage.

7. The electronic device of claim 5, wherein the code generation circuit is configured to count the drive clock to generate the drive code, the value of which is increased when the feedback voltage is generated at a voltage level less than the voltage level of the reference voltage.

8. The electronic device of claim 5, wherein the drive circuit is configured to:
cause the internal voltage to have a magnitude determined by the value of the drive code, and
cause the internal voltage to be reset when the value of the drive code is reset.

9. An electronic device comprising:
an internal voltage generation circuit configured to:
detect a voltage level of an internal voltage;
generate a drive code, responsive to a drive clock;
generate the internal voltage, the voltage level of which is determined by the drive code the drive code being reset, responsive to a predetermined internal voltage and an operation flag; and
a load circuit configured to receive the internal voltage;
wherein the operation flag is generated by the operation of the load circuit;
wherein the operation flag is generated by the operation of the load circuit, wherein the internal voltage generation circuit comprises a drive control circuit configured to generate a drive control signal, responsive to a feedback voltage generated from the internal voltage and a reference voltage, an oscillator configured to receive the drive control signal to generate the drive clock, and a code generation circuit configured to receive the drive control signal and the drive clock to generate the drive code.

10. The electronic device of claim 9, wherein the operation flag is generated before operation of the load circuit is stopped.

11. The electronic device of claim 9, wherein the internal voltage generation circuit is configured to deactivate the drive clock and to reset the drive code when the operation flag is generated and resetting the internal voltage is required.

12. The electronic device of claim 9, wherein the internal voltage generation circuit further comprises:
a drive circuit configured to generate the internal voltage, responsive to the drive code.

13. The electronic device of claim 12, wherein the code generation circuit is configured to count the drive clock and thereby generate the drive code, and configured to increase the code value when the feedback voltage is generated at a voltage level less than the voltage level of the reference voltage level.

14. The electronic device of claim 12, wherein the code generation circuit is configured to deactivate the drive clock and to reset the drive code when the operation flag is generated and when the feedback voltage has a voltage level equal to or greater than the reference voltage.

15. The electronic device of claim 12, wherein the code generation circuit is configured to count drive clock pulses and thereby generate the drive code, the value of which decreases when the operation flag is not generated and the feedback voltage is generated at a voltage level equal to or greater than that of the reference voltage.

16. The electronic device of claim 12, wherein the drive circuit is configured to:
provide the internal voltage with a driving force set depending on the drive code, and
drive the internal voltage with an initial driving force to reset the internal voltage when the drive code is reset.

17. An internal voltage generation circuit comprising:
a drive control circuit configured to generate a drive control signal, responsive to a feedback voltage generated from an internal voltage and a reference voltage;
an oscillator configured to receive the drive control signal to generate the drive clock;
a code generation circuit configured to receive the drive control signal and the drive clock to generate a drive code, responsive to the drive control signal; and
a drive circuit configured to provide the internal voltage at a magnitude determined by the drive code,
wherein the drive code is reset when the feedback voltage is generated at a voltage level equal to or greater than that of the reference voltage.

18. The internal voltage generation circuit of claim 17, wherein the code generation circuit is configured to count the drive clock to generate the drive code, the value of which increase when the feedback voltage is generated at a voltage level less than that of the reference voltage.

19. The electronic device of claim 17, wherein the drive circuit is configured to:

generate an internal voltage determined by the value of the drive code; and provide an internal voltage having a magnitude that resets the internal voltage when the drive code is reset.

* * * * *